United States Patent Office 3,236,895
Patented Feb. 22, 1966

3,236,895
POLYOXYALKYLENEPOLYAMINES
John Malcolm Lee and J C. Winfrey, Lake Jackson, Tex., assignors to The Dow Chemical Company, Midland, Mich., a corporation of Delaware
No Drawing. Filed Dec. 12, 1960, Ser. No. 75,103
9 Claims. (Cl. 260—584)

This application is a continuation-in-part of our copending application Serial No. 730,279, filed April 13, 1958, now abandoned.

The present invention relates to new amine compounds and to a new and useful method of preparing these new amine compounds as well as known compounds. More particularly the present invention is concerned with a new and useful process employing novel reactants to obtain both the known as well as the new amines.

The amines of the invention have the general formula

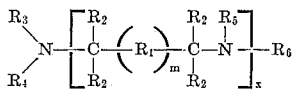

wherein $R_1$ is selected from the group consisting of alkylene radicals having from 1 to 18 carbon atoms and the radical

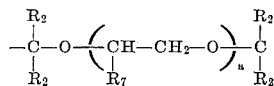

wherein $a$ represents an integer which will provide with the carbon atoms of attachment a polyoxyalkylene chain having a molecular weight of at least 249; $m$ represents an integer from 0 to 1; $R_7$ represents a member selected from the group consisting of hydrogen and lower alkyl having from 1 to 2 carbon atoms; $x$ represents an integer from 1 to 3; each $R_2$ represents a radical independently selected from the group consisting of hydrogen and lower alkyl having from 1 to 6 carbon atoms; $R_3$, $R_4$, $R_5$ and $R_6$ each represent an independently selected radical having the formula

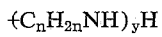

wherein $n$ is an integer from 2 to 4 and $y$ represents an integer from 0 to 3. They can be prepared by reacting an organic compound having the formula

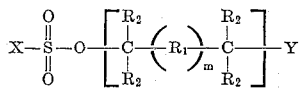

wherein $R_1$ and $R_2$ have the aforeassigned significance and X represents a hydrocarbon radical selected from the group consisting of lower alkyl and phenyl radicals and the symbol Y represents a radical selected from the group consisting of chlorine and

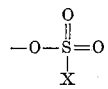

where X has the same significance as above, with liquid ammonia or an organic amine having at least one primary amino nitrogen atom, preferably in the anhydrous state, by introducing the sulfonic acid ester into intimate contact with the ammonia or amine. Upon completion of the reaction the excess of the nitrogen compound is removed by suitable means and the reaction mixture treated with caustic alkali to precipitate the corresponding metal sulfonate from solution and liberate the desired product, the amine. The latter may then be purified by fractional distillation or the like.

It is to be understood that the process of the present invention can be operated in a batchwise or continuous manner, and the excess nitrogen compound from the reactor can be recovered and recycled. Further, the metal sulfonate may also be recovered and employed in the preparation of the starting sulfonic acid ester in manners well known in the art.

As exemplary of the various sulfonic acids esters which can be employed are the 1,2-bis(alkane- and benzene-sulfoxy)alkanes as for example 1,2-bis(methanesulfoxy)ethane,
1,2-bis(methanesulfoxy)propane,
1,2-bis(ethanesulfoxy)propane,
1,3-bis(propanesulfoxy)propane,
1,2-bis(benzenesulfoxy)ethane,
1,2-bis(benzenesulfoxy)propane,
2,3-bis(benzene-sulfoxy)butane and the like;

the bis-toluenesulfoxy esters of the alpha,omega-polyoxyalkylene glycols such as the alpha,omega-polyoxyethylene, polyoxypropylene or polyoxybutylene glycols having molecular weights of from 249 and above. Further, one can employ the disulfonates or sulfonate-chloride of dihydroxyalkanes (diols) such as 1,3-dihydroxypropane (propanediol), 1,4-dihydroxybutane, 1,6-dihydroxyhexane, 1,10-dihydroxydecane, 1,18-dihydroxyoctadecane as well as the 1,3-dihydroxybutanes, 1,3- or 1,6- or 1,9-dihydroxyoctadecanes and the like.

The preferred subgenera of compounds which can be prepared in the manner of the process hereinbefore described are the vicinal primary diamines having the general formula

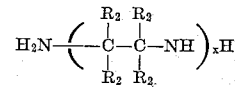

wherein $R_2$ and $x$ have the aforesaid significance; and, the polyoxyalkylenediamines having the general formula $$H(HNC_nH_{2n})_yNH\text{—}C_3H_6(OC_3H_6)_aNH(C_nH_{2n}NH)_yH$$

wherein $a$, $n$ and $y$ have the aforesaid significance. Thus, the preferred compounds are 1,2-ethylenediamine, 1,2-propylenediamine, 1,2-butylenediamine, 2,3-butylenediamine, 1,2-amylenediamine, 2,3-pentylenediamine, 1,2-, 2,3-, or 3,4-hexylenediamine, 1,2-, 2,3-, or 3,4-heptylenediamine; 1,2-, 2,3-, 3,4-, 4,5-, 5,6-, 6,7-, 7,8-, or 8,9-octadecylenediamines and alpha, omega-polyoxypropylene diamines derived from polyoxypropylene glycols having molecular weights of at least 249. Thus in tabular form some of these new compounds can be identified as follows.

$H(HNC_nH_{2n})_yNH\text{—}C_3H_6O(C_3H_6O)_aC_3H_6NH(C_nH_{2n}NH)_yH$

| n | y | a | Polyoxypropylene glycol starting reactant | M.W. of glycol |
|---|---|---|---|---|
| 0 | 0 | 2 | Tetrapropylene glycol | (249) |
| 2 | 1 | 2 | do | (249) |
| 2 | 2 | 2 | do | (249) |
| 0 | 0 | 2 | do | (249) |
| 3 | 1 | 2 | do | (249) |
| 3 | 2 | 2 | do | (249) |
| 0 | 0 | 3 | Pentapropylene glycol | 307 |
| 2 | 1 | 3 | do | |
| 2 | 2 | 3 | do | 307 |
| 0 | 0 | 3 | do | 307 |
| 3 | 1 | 3 | do | 307 |
| 3 | 2 | 3 | do | 307 |
| 0 | 0 | 4 | Hexapropylene glycol | 365 |
| 2 | 1 | 4 | do | 365 |
| 2 | 2 | 4 | do | 365 |
| 0 | 0 | 4 | do | 365 |
| 3 | 1 | 4 | do | 365 |
| 3 | 2 | 4 | do | 365 |
| 0 | 0 | 10 | | 813 |
| 0 | 0 | 60 | | 3,713 |

It is to be understood that the above table illustrates only a few of the possible combinations which produce compounds within the scope of the present invention. The new amines are liquids or solids and have many uses particularly in curing epoxy resins, in polyurethane chemistry and in polyester chemistry.

The following examples illustrate the methods of the present invention and the new compounds which can be prepared by these methods but are not to be construed as limiting.

*Example 1*

A solution of 100 grams (0.2808 mole) of 1,2-bis-(benzenesulfoxy)propane dissolved in 150 grams of dioxane was forced by means of nitrogen pressure into a reactor containing 289 grams (17 moles) of liquid anhydrous $NH_3$ heated to 100° C. and under autogenous pressure. Upon completion of the addition of the ester (about 45 minutes), heating was discontinued and the reactor and the contents allowed to cool for one hour. Thereafter the excess $NH_3$ was allowed to distill out and the dioxane solution was treated with 50 percent caustic in an amount in excess of that theoretically necessary to precipitate the benzenesulfonic acid as the sodium benzenesulfonate. The salt was filtered out and the filtrate was fractionally distilled under reduced pressure, to obtain a fraction boiling at 62° C. at 112 mm. which consisted of dioxane and propylenediamine. This fraction was treated with anhydrous CHI to precipitate the dihydrochloride of propylenediamine. The latter was separated and converted to the free base with 50 percent caustic, the amine layer separated off and redistilled, to obtain 6.65 grams of propylenediamine. The next fraction recovered, 7.4 grams of propylenediamine, was combined with the redistilled product of the previous fraction to obtain 14.05 grams of propylenediamine boiling at 65° C. at 94 mm. pressure, representing a 67.7 percent yield of desired product. The pot residue, a dipropylenetriamine product, raised the conversion of ester to amine to 93 percent.

*Example 2*

100 grams (0.432 mole) of methanesulfonic acid diester of propylene glycol [1,2-bis(methanesulfoxy)propane] was dissolved in 150 ml. of dioxane and forced by means of nitrogen pressure into an autoclave containing 285 grams (16.76 moles) of anhydrous ammonia at 110° C. The addition of the ester was in a portionwise manner and was complete in 30 minutes. The bomb was allowed to cool for one hour and the excess ammonia vented off. The solid amine salt which had formed was dissolved in a minimum of water and the solution treated with an excess of caustic to precipitate the methanesulfonic acid as its sodium salt, which was separated. The filtrate was thereafter fractionally distilled to obtain a fraction boiling at 63–67° C. at 94 mm. identified as propylenediamine. As a result of these operations there was recovered a propylenediamine product representing a 25.4 percent yield. The distillation residue consisted essentially of dipropylenetriamine and tripropylenetetramine.

*Example 3*

150 grams (8.82 moles) anhydrous ammonia was placed in a pressure bomb and heated to 87° C. 100 grams (0.453 mole) of beta-chloroethyl benzenesulfonate was added by means of nitrogen pressure over a period of ten minutes. The reactor temperature rose immediately to 115° C. and then fell back to 87° during the next hour. The bomb was thereafter allowed to cool to room temperature and the excess ammonia vented off. The solids were dissolved in a minimum amount of water. Thereafter approximately 400 ml. of dioxane was added and the resulting solution treated with excess caustic to precipitate the sulfonate. The precipitate was removed and the filtrate fractionally distilled to obtain 10.15 grams of ethylenediamine boiling at 70° C. at 102 mm. pressure, or a 37.2 percent yield. There was also isolated 1.205 grams of diethylenetriamine. The pot residue of eight grams was composed of higher amine polymers. Total conversion of sulfonate to amines was about 80 percent.

*Example 4*

97.8 grams of the di(methanesulfonic acid ester) of polypropylene glycol (glycol molecular weight 400) was added over a 15 minute period to 170.9 grams of anhydrous ammonia in a pressure bomb maintained at 100° C. Upon completion of the addition the bomb and mixture were maintained at 100° C. by external heating for two hours. Thereafter the excess ammonia was distilled out and the remaining bomb contents treated with 50 percent caustic. The amine product separated, was recovered and dried by azeotropic distillation with benzene. The dried product weighed 64.4 grams (90.1 percent yield) and analyzed.

5.71 percent primary amine nitrogen, and
0.292 percent secondary amine nitrogen

*Example 5*

In the manner of Example 4, by employing 99.8 grams of di(methane sulfonic acid ester) of polypropylene glycol (the glycol having a moleculer weight of 2000) in place of the diester of the 400 molecular weight glycol, there was obeained 75.3 grams of polyoxypropylene amines. This represented an 81.4 percent yield. The product analyzed 0.478 percent primary amine nitrogen and 0.083 percent secondary amine nitrogen.

*Example 6*

In the manner of Example 4, by employing 300 ml. of ammonium hydroxide (0.238 gram of $NH_3$ per ml.) in place of anhydrous ammonia, there was obtained the polyoxypropylene diamine (from glycol having molecular weight of 400) having 4.86 percent by weight primary amine and 0.033 percent secondary amine.

*Example 7*

To a refluxing solution of dioxane and a 10-fold excess of diethylenetriamine the sulfonate ester of the desired polyglycol is added dropwise. The temperature is held at 100–120° C. and refluxing continued for one hour. The material is then transferred to a separatory funnel and the upper layer retained and treated with 50 percent caustic. The amine layer is collected and dryed by azeotropic distillation with benzene or dioxane, and the excess DETA if any is removed under vacuum. The amine content is determined by titration in isopropanol with a solution of HCl in isopropanol. Tertiary amine content is determined by peracetic acid titrations. The following table shows some typical results of such experiments.

|    | Polyol [1] | Total N | Primary N | Sec. N | Tert. N |
|---|---|---|---|---|---|
| 2  | P-400  |        | 5.26 | 10.07 | nil. |
| 11 | P-400  | 12.86  | 4.54 | 9.52  | nil. |
| 22 | P-2000 | 1.971  | 0.74 | 1.41  | nil. |

[1] Numbers ndicate molecular weight of polyoxypropylene glycol.

Various inert solvents may be employed for introducing the ester in a highly dispersed state into anhydrous ammonia or amine. Thus, dioxane, benzene, cyclohexane and the like may be employed.

The amines prepared in the foregoing manner are useful for curing epoxy resins.

Examples of epoxides cured in this manner are listed in the following table:

IZOD IMPACT STRENGTH OF DER 332 [1] CURED WITH THEORETICAL RATIO OF DIAMINE COMPOUND

| Cure | P-400 DETA [2] | P-400 DIAMINE [3] |
|---|---|---|
| 4 hours at 120° | 0.49 | 2.5 |
| 4 hours at 145° | 0.23 | 0.88 |
| 18 hours at room temperature | 0.25 | |
| 64 hours at 180° | 0.26 | |

[1] Diglycidyl ether of Bisphenol-A.
[2] Diethylenetriamine adduct of polyoxypropylene glycol having an average molecular weight of 400.
[3] Diammonia adduct of polyoxypropylene glycol having an average molecular weight of 400.

The amines have been further tested and found useful as brake fluid additives because they do not corrode metals and do not soften rubbers. They react with polycarboxylic acids to form solid, polymeric polyamides and with organic polyisocyanates to form solid, polymeric urea resins.

It is to be understood that other known methods for preparing amines can be employed to make some of the new high molecular weight amine adducts of polyoxypropylene glycols. The following examples are illustrative of some of the new compounds prepared by the known methods.

*Example 8*

A 1-liter autoclave bomb was loaded with 400 ml. of polypropylene glycol of average mol. wt. 400, and, 50 grams of freshly prepared Raney nickel catalyst which was suspended in alcoholic medium and weighed while wet, the bomb was then sealed and placed in a Dry Ice chest for about 1½–3 hours to chill thoroughly. The bomb was then removed and 100 ml. of liquid anhydrous $NH_3$ was fed into it. It was then resealed and placed into a rocker containing a heating jacket. The temperature at this point was −25° C. Then 500 p.s.i.g. $H_2$ gas was applied to the bomb for five minutes during which time the rocker was in motion. Then the line was sealed off and heat applied to the bomb until a temperature of 240–250° C. was obtained. The pressure within the bomb at this point was 2000–2500 p.s.i.g. The bomb was kept at this temperature for 30 hours and then the heat was shut off and the bomb rocked for several to cool to room temperature. The bomb was then removed from the rocker and the excess $NH_3$ and $H_2$ bled from the bomb. It was then opened and the contents filtered. The filtrate was placed into a pot on a small distillation column and a cold trap was placed at the receiving end of the column. A vacuum of from 1–5 mm. pressure was gradually applied to the pot and then heat was applied until the pot temperature reached 50° C. The pot was kept at 50° for 30 minutes and then the heat and vacuum were withdrawn and the pot allowed to cool. The product was colorless and clear with a slight amine odor and contained approximately 40 percent mono- and 60 percent diaminated polyglycol with no unreacted polyglycol.

In the following examples the general procedure of Example 8 was used. The catalyst was pelletized Raney nickel. P-250 and P-400 designate polypropylene glycol of average mol. wt. 250 and 400, respectively. The fraction of the total OH present that was converted to $NH_2$ is recorded as the percent amination.

*Example 9*

| | | |
|---|---|---|
| P-400 | moles | 1 |
| $NH_3$ (anhydrous liquefied) | do | 5 |
| Catalyst | grams | 75 |
| Hydrogen | p.s.i.g | 500 |
| Reaction temperature | °C | 245 |
| Reaction pressure | p.s.i.g | 2400–2000 |
| Reaction time | hours | 30 |

Product was colorless after stripping, 68% amination.

*Example 10*

| | | |
|---|---|---|
| P-250 | moles | 1.5 |
| $NH_3$ (anhydrous, liquefied) | do | 7.5 |
| Catalyst | grams | 113 |
| Nitrogen | p.s.i.g | 500 |
| Reaction temperature | °C | 230–250 |
| Reaction pressure | p.s.i.g | 2700–2450 |
| Reaction time | hours | 30 |

Product was very highly colored, 48% amination.

*Example 11*

| | | |
|---|---|---|
| P-250 | moles | 1.5 |
| $NH_3$ (anhydrous, liquefied) | do | 7.5 |
| Catalyst | grams | 113 |
| Hydrogen | p.s.i.g | 500 |
| Reaction temperature | °C | 235–255 |
| Reaction pressure | p.s.i.g | 2650–2050 |
| Reaction time | hours | 30 |

Product was colorless after stripping, 66% aminated.

*Example 12*

| | | |
|---|---|---|
| P-250 | moles | 1.5 |
| $NH_3$ (anhydrous, liquefied) | do | 7.5 |
| Catalyst | grams | 113 |
| Reaction temperature | °C | 235–245 |
| Reaction pressure | p.s.i.g | 1750–1500 |
| Reaction time | hours | 30 |

Product was very highly colored (black), 52% aminated.

*Example 13*

| | | |
|---|---|---|
| 2-methoxyethanol | moles | 4 |
| $HN_3$ (anhydrous, liquified) | do | 10 |
| Catalyst | grams | 75 |
| Hydrogen | p.s.i.g | 500 |
| Reaction temperature | °C | 225–240 |
| Reaction pressure | p.s.i.g | 2700–2790 |
| Reaction time | hours | 30 |

The reaction mixture was subjected to caustic extraction after which distillation of the amine layer gave a colorless, 77% aminated product at 25% yield.

*Example 14*

| | | |
|---|---|---|
| Diethylene glycol monoethyl ether | moles | 3.0 |
| $HN_3$ (anhydrous, liquefied) | do | 7.5 |
| Catalyst | grams | 110 |
| Hydrogen | p.s.i.g | 500 |
| Reaction temperature | °C | 230 |
| Reaction pressure | p.s.i.g | 2250–1700 |
| Reaction time | hours | 6–7 |

After distillation, the product was colorless, 94% aminated at 40% yield.

The general method illustrated by Examples 8, 9, 11, 13 and 14 is disclosed and claimed in the application of Crowe and Leathers, Serial No. 66,706, filed November 2, 1960, now abandoned.

We claim:
1. An amine having the formula

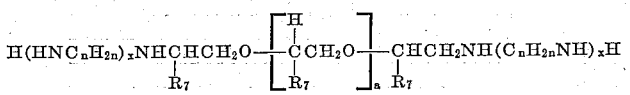

wherein each $R_7$ represents an independently selected radical from the group consisting of hydrogen and lower alkyl radicals having from 1 to 6 carbon atoms; wherein $n$ is an integer from 2 to 4 and $x$ represents an integer from 0 to 3, and $a$ represents an integer from 2 to 60.

2. The amine of claim 1 wherein each $x$ is zero and $R_7$ is methyl.
3. The amine of claim 2 wherein $a$ is 2.
4. The amine of claim 2 wherein $a$ is 4.
5. The amine of claim 2 wherein $a$ is 32.
6. The amine of claim 1 wherein each $x$ is 2 and $R_7$ is methyl.
7. The amine of claim 6 wherein $a$ is 2.
8. The amine of claim 6 wherein $a$ is 4.
9. The amine of claim 6 wherein $a$ is 32.

References Cited by the Examiner

UNITED STATES PATENTS

| | | | |
|---|---|---|---|
| 2,716,134 | 8/1955 | Reynolds et al. | 260—583 X |
| 2,767,214 | 10/1956 | Bersworth | 260—584 |
| 2,941,967 | 6/1960 | Moeller et al. | 260—584 X |
| 2,964,564 | 12/1960 | Blaser et al. | 260—584 |
| 3,070,552 | 12/1962 | Tesoro et al. | 260—584 X |

OTHER REFERENCES

Laakso et al.: Jour. Amer. Chem. Soc., vol. 73, pp. 3518–3520 (1951).

Taylor et al.: Sidgwick's Organic Chemistry of Nitrogen (1949), pages 13, 14 and 157.

CHARLES B. PARKER, *Primary Examiner.*

Disclaimer 3,236,895.—*John Malcolm Lee* and *J. C. Winfrey*, Lake Jackson, Tex. POLYOXYALKYLENEPOLYAMINES. Patent dated Feb. 22, 1966. Disclaimer filed Nov. 13, 1972, by the assignee, *The Dow Chemical Company*.

Hereby enters this disclaimer to claim 1 of said patent.

[*Official Gazette February 19, 1974.*]